US012122324B2

(12) United States Patent
Peterson (10) Patent No.: US 12,122,324 B2
(45) Date of Patent: Oct. 22, 2024

(54) VEHICULAR POWER DOOR SENSING AND OPERATING SYSTEM

(71) Applicant: Magna Mirrors of America, Inc., Holland, MI (US)

(72) Inventor: Kenneth C. Peterson, Ada, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 221 days.

(21) Appl. No.: 17/932,700

(22) Filed: Sep. 16, 2022

(65) Prior Publication Data

US 2023/0089000 A1 Mar. 23, 2023

Related U.S. Application Data

(60) Provisional application No. 63/261,304, filed on Sep. 17, 2021.

(51) Int. Cl.
| | |
|---|---|
| *E05F 15/73* | (2015.01) |
| *B60R 25/20* | (2013.01) |
| *B60R 25/24* | (2013.01) |
| *E05B 81/76* | (2014.01) |
| *E05B 81/78* | (2014.01) |
| *E05F 15/43* | (2015.01) |

(52) U.S. Cl.
CPC ........ *B60R 25/243* (2013.01); *B60R 25/2045* (2013.01); *E05B 81/77* (2013.01); *E05B 81/78* (2013.01); *E05F 15/431* (2015.01); *E05F 15/73* (2015.01); *E05Y 2400/818* (2013.01); *E05Y 2400/852* (2013.01); *E05Y 2900/50* (2013.01); *E05Y 2900/531* (2013.01)

(58) Field of Classification Search
None
See application file for complete search history.

(56) References Cited

U.S. PATENT DOCUMENTS

| | | |
|---|---|---|
| 6,587,186 B2 | 7/2003 | Bamji et al. |
| 6,674,895 B2 | 1/2004 | Rafii et al. |
| 6,678,039 B2 | 1/2004 | Charbon |
| 6,690,354 B2 | 2/2004 | Sze |
| 6,710,770 B2 | 3/2004 | Tomasi et al. |
| 6,876,775 B2 | 4/2005 | Torunoglu |
| 6,906,793 B2 | 6/2005 | Bamji et al. |
| 6,919,549 B2 | 7/2005 | Bamji et al. |
| 7,053,357 B2 | 5/2006 | Schwarte |
| 7,157,685 B2 | 1/2007 | Bamji et al. |
| 7,176,438 B2 | 2/2007 | Bamji et al. |

(Continued)

*Primary Examiner* — John F Mortell
(74) *Attorney, Agent, or Firm* — HONIGMAN LLP (57) ABSTRACT

A vehicular access system includes a sensing panel at a door of a vehicle including a panel, at least one capacitive touch sensor for sensing proximity of a user at a touch sensing region of the panel, and a radar sensor sensing exterior of the vehicle. An electronic control unit (ECU) includes a data processor for processing sensor data captured by the radar sensor to detect presence of objects exterior of the vehicle. At least one indicator visually indicates status of the system. Responsive to receiving an open door command, (i) the at least one indicator illuminates and (ii) the system determines, using the sensor data, whether a detected object is within a swing path of the door. The system, responsive to determining that no object is within the swing path of the door, opens the door.

25 Claims, 9 Drawing Sheets

(56) References Cited

U.S. PATENT DOCUMENTS

| | | | |
|---|---|---|---|
| 7,203,356 B2 | 4/2007 | Gokturk et al. | |
| 7,212,663 B2 | 5/2007 | Tomasi | |
| 7,283,213 B2 | 10/2007 | O'Connor et al. | |
| 7,310,431 B2 | 12/2007 | Gokturk et al. | |
| 7,321,111 B2 | 1/2008 | Bamji et al. | |
| 7,340,077 B2 | 3/2008 | Gokturk et al. | |
| 7,352,454 B2 | 4/2008 | Bamji et al. | |
| 7,375,803 B1 | 5/2008 | Bamji | |
| 7,379,100 B2 | 5/2008 | Gokturk et al. | |
| 7,379,163 B2 | 5/2008 | Rafii et al. | |
| 7,405,812 B1 | 7/2008 | Bamji | |
| 7,408,627 B2 | 8/2008 | Bamji et al. | |
| 8,013,780 B2 | 9/2011 | Lynam | |
| 8,027,029 B2 | 9/2011 | Lu et al. | |
| 9,036,026 B2 | 5/2015 | Dellantoni et al. | |
| 9,146,898 B2 | 9/2015 | Ihlenburg et al. | |
| 9,174,517 B2 | 11/2015 | Scheuring et al. | |
| 9,527,394 B1 | 12/2016 | Tang et al. | |
| 9,575,160 B1 | 2/2017 | Davis et al. | |
| 9,599,702 B1 | 3/2017 | Bordes et al. | |
| 9,689,967 B1 | 6/2017 | Stark et al. | |
| 9,711,050 B2 | 7/2017 | Ansari | |
| 9,753,121 B1 | 9/2017 | Davis et al. | |
| 9,869,762 B1 | 1/2018 | Alland et al. | |
| 9,878,656 B2 | 1/2018 | Gergets et al. | |
| 9,954,955 B2 | 4/2018 | Davis et al. | |
| 10,246,009 B2 | 4/2019 | McMahon et al. | |
| 10,308,167 B2 | 6/2019 | Caron | |
| 10,422,166 B2 | 9/2019 | Papanikolaou et al. | |
| 10,443,292 B2 | 10/2019 | Baruco et al. | |
| 10,816,993 B1 | 10/2020 | Tran | |
| 10,866,306 B2 | 12/2020 | Maher et al. | |
| 10,889,265 B2 | 1/2021 | Sobecki et al. | |
| 10,914,110 B2 | 2/2021 | Mitchell | |
| 10,928,830 B1 | 2/2021 | Tran | |
| 10,955,855 B1 | 3/2021 | Tran | |
| 10,992,755 B1 | 4/2021 | Tran | |
| 11,167,771 B2 | 11/2021 | Caron et al. | |
| 11,851,920 B2 | 12/2023 | Peterson et al. | |
| 11,866,983 B2 | 1/2024 | Schatz et al. | |
| 11,885,158 B2 | 1/2024 | Cumbo et al. | |
| 2009/0284405 A1 | 11/2009 | Salmon et al. | |
| 2010/0245066 A1 | 9/2010 | Sarioglu et al. | |
| 2010/0253543 A1 | 10/2010 | Szczerba et al. | |
| 2011/0196568 A1 | 8/2011 | Nickolaou et al. | |
| 2012/0234621 A1 | 9/2012 | Syvret et al. | |
| 2015/0015434 A1 | 1/2015 | Okita et al. | |
| 2017/0063050 A1 | 3/2017 | Fishovitz et al. | |
| 2017/0152687 A1* | 6/2017 | Koizumi | E05B 81/62 |
| 2017/0222311 A1 | 8/2017 | Hess et al. | |
| 2017/0254873 A1 | 9/2017 | Koravadi | |
| 2017/0276788 A1 | 9/2017 | Wodrich | |
| 2017/0292310 A1 | 10/2017 | Podkopayev | |
| 2017/0306684 A1 | 10/2017 | Baruco et al. | |
| 2017/0315231 A1 | 11/2017 | Wodrich | |
| 2017/0324162 A1 | 11/2017 | Khachaturian et al. | |
| 2017/0356994 A1 | 12/2017 | Wodrich et al. | |
| 2018/0015875 A1 | 1/2018 | May et al. | |
| 2018/0045812 A1 | 2/2018 | Hess | |
| 2018/0170309 A1 | 6/2018 | McMahon et al. | |
| 2018/0231635 A1 | 8/2018 | Woehlte | |
| 2018/0238099 A1 | 8/2018 | Schatz et al. | |
| 2019/0101634 A1 | 4/2019 | Baheti et al. | |
| 2019/0128040 A1 | 5/2019 | Mitchell | |
| 2019/0153770 A1 | 5/2019 | Mitchell et al. | |
| 2019/0154439 A1 | 5/2019 | Binder | |
| 2019/0162010 A1 | 5/2019 | Rafrafi et al. | |
| 2019/0162821 A1 | 5/2019 | Rafrafi et al. | |
| 2019/0162822 A1 | 5/2019 | Rafrafi et al. | |
| 2019/0162851 A1 | 5/2019 | Ullrich | |
| 2019/0255917 A1 | 8/2019 | Nakano | |
| 2019/0309564 A1 | 10/2019 | Mitchell et al. | |
| 2019/0339382 A1 | 11/2019 | Hess et al. | |
| 2020/0018111 A1 | 1/2020 | Akbarian et al. | |
| 2020/0072947 A1 | 3/2020 | Miu et al. | |
| 2020/0088839 A1 | 3/2020 | Miu et al. | |
| 2020/0157873 A1 | 5/2020 | Sabatini et al. | |
| 2020/0249354 A1 | 8/2020 | Yeruhami et al. | |
| 2021/0003693 A1 | 1/2021 | Jales et al. | |
| 2021/0101529 A1* | 4/2021 | Thorngren | E05B 85/10 |
| 2021/0149021 A1 | 5/2021 | Pinnock | |
| 2021/0262274 A1 | 8/2021 | Schatz et al. | |
| 2022/0342066 A1 | 10/2022 | Burger et al. | |
| 2022/0349220 A1 | 11/2022 | Ferri et al. | |
| 2022/0365207 A1 | 11/2022 | Corner et al. | |
| 2024/0028126 A1 | 1/2024 | Corner et al. | |

\* cited by examiner

VEHICULAR POWER DOOR SENSING AND OPERATING SYSTEM

CROSS REFERENCE TO RELATED APPLICATION

The present application claims the filing benefits of U.S. provisional application Ser. No. 63/261,304, filed Sep. 17, 2021, which is hereby incorporated herein by reference in its entirety.

FIELD OF THE INVENTION

The present invention relates to door handles for vehicles and, more particularly, to an exterior door handle for opening a side door of a vehicle.

BACKGROUND OF THE INVENTION

A door handle for a vehicle door typically includes a handle portion that is pivotable relative to a base portion, whereby pivotal movement of the handle portion pulls at a cable or rod to electrically trigger or move a latch mechanism to release the latch and open the door.

SUMMARY OF THE INVENTION

The present invention provides a vehicular access system. The vehicular access system includes a sensing module disposed at a door of a vehicle equipped with the vehicular access system. The sensing module includes (i) a panel disposed at the door having an exterior surface that corresponds with an exterior surface of the door, (ii) at least one capacitive touch sensor for sensing proximity of a user at a touch sensing region of the panel and (iii) a radar sensor sensing exterior of the vehicle and capturing sensor data. The system includes an electronic control unit (ECU) having electronic circuitry and associated software. The electronic circuitry of the ECU includes a data processor for processing sensor data captured by the radar sensor to detect presence of an object exterior of the vehicle. The system includes at least one indicator for visually indicating status of the vehicular access system. Responsive to touch or proximity of the user at the at least one capacitive touch sensor, an open door command is provided to the ECU. Responsive to receiving the open door command, (i) the at least one indicator illuminates and (ii) the vehicular access system determines, using the sensor data, whether a detected object is within a swing path of the door. The vehicular access system, responsive to determining that no object is within the swing path of the door, opens the door.

DESCRIPTION OF THE PREFERRED EMBODIMENTS

Figure 1:
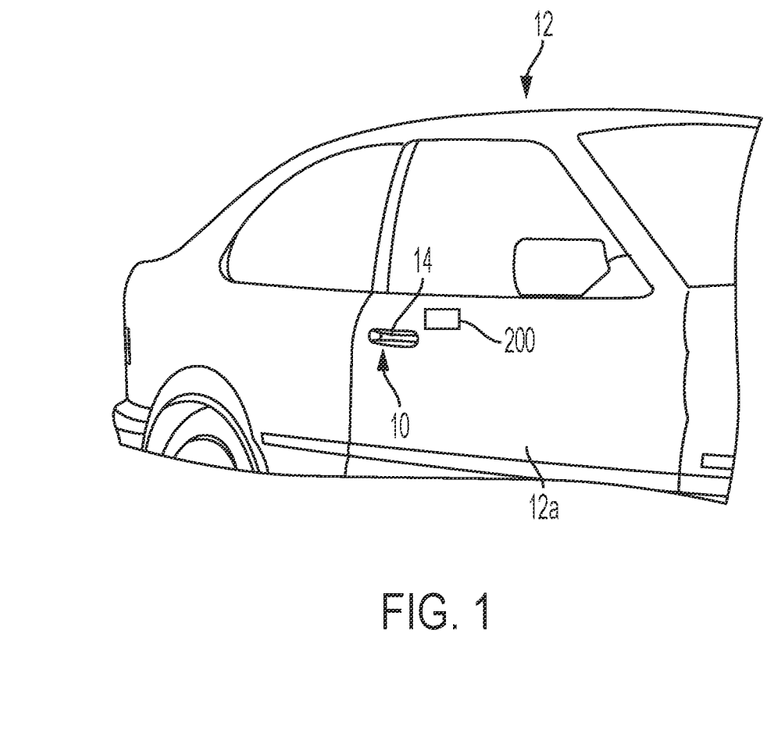
FIG. 1 is a perspective view of a vehicle with a door handle assembly.

Referring now to the drawings and the illustrative embodiments depicted therein, a vehicle door handle assembly 10 is mountable to a door 12a of a vehicle 12 and operable to release a latch mechanism (not shown) of the door 12a to open the vehicle door (FIG. 1). The vehicle door handle assembly 10 includes a handle portion 14 that is disposed at the door and that is fixedly mounted at the door or to a bracket mounted to the door. The vehicle door handle assembly may be part of a vehicle access system that includes a panel 200 with one or more user inputs that grant access to the vehicle.

Many automotive manufacturers have shown an interest in providing vehicles with "seamless entry", or the ability for the driver and/or passengers to enter a vehicle without the need to manually open the door (i.e., actuate the door handle) or, in some instances, to even touch the door. Other less ambitious product plans involve minimal contact with the door or power assisted opening and closing. Thus, it is advantageous to provide power door actuators that are capable of automatic door opening and closing and/or power assist and door position holding.

Although a vehicle user may not need to have a handle at the door to grab (as the door may be powered and open/close automatically), the vehicle may still need to provide the user with a means to signal his or her intent to have the door open or close and/or to provide authentication to unlock the vehicle. BLUETOOTH and Ultra-wideband (UWB) radio technologies have been proposed to serve both functions, but these approaches may be inadequate on their own. Alternative means to enter a vehicle should be provided should the primary means of signaling and authentication fail.

Implementations herein include a vehicular power door system or vehicular access system that provides additional human-machine interface (HMI) functions for the user in a familiar and convenient location in conjunction with or formerly occupied by a conventional grab handle. The purpose of this HMI may include, but is not limited to, signaling the intent to activate several functions such as opening and closing doors, opening and closing a trunk or a frunk, opening and closing windows and/or a sunroof or moonroof, locking/unlocking the vehicle, enabling heating/cooling of the vehicle, and/or signaling an alarm of the vehicle.

Additionally or alternatively, the user interface may provide a secondary means of authentication with, for example, Near Field Communication (NFC) with a phone or access card or key fob, and by using lighting to assist in indicating to the user the state of the vehicle, such as locked or unlocked, whether the presence of the user is acknowledged, and if door opening or closing is imminent.

Figure 2:
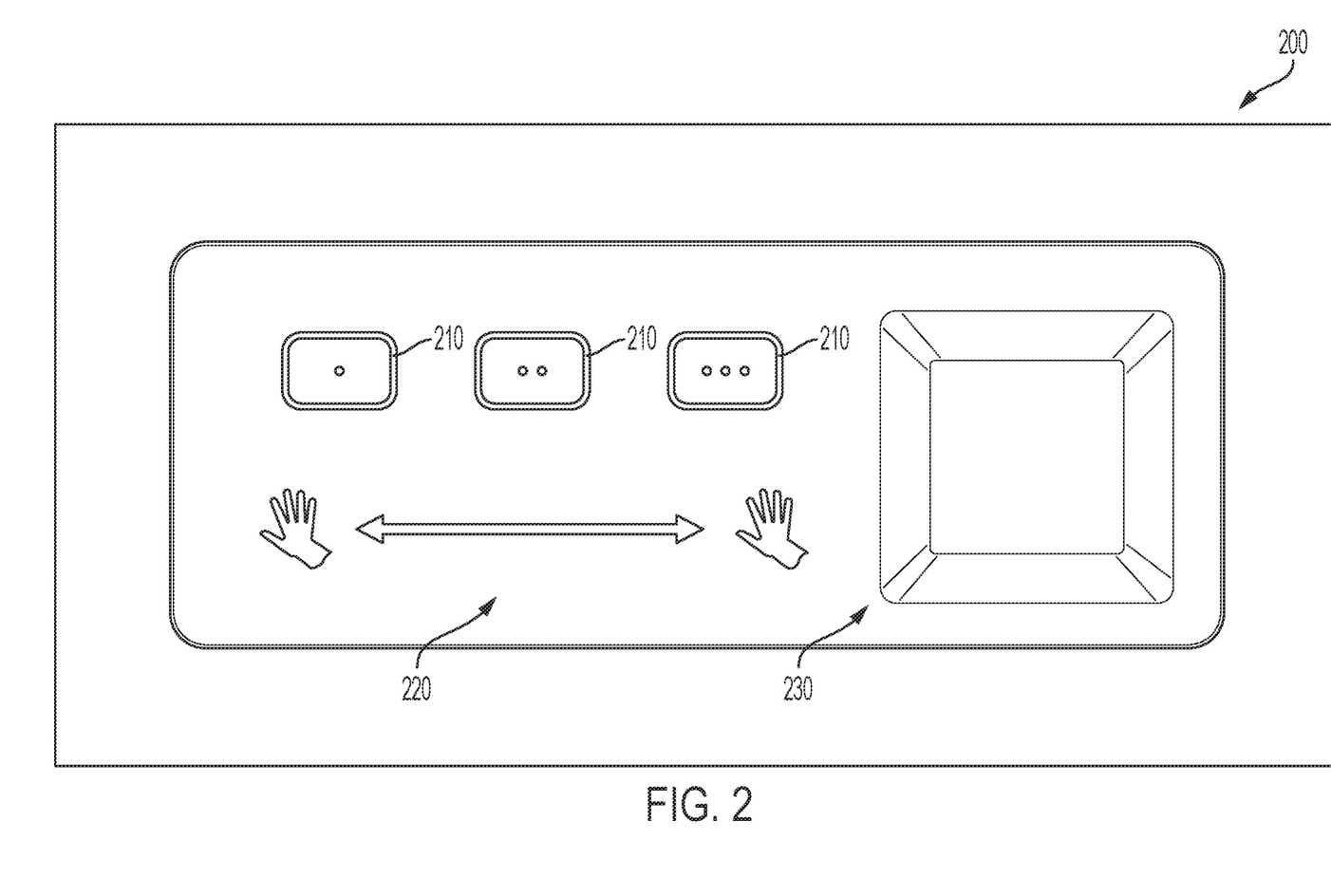
FIG. 2 is a plan view of a panel of a vehicular access system of the vehicle of FIG. 1.

Referring now to FIG. 2, the panel 200 of the system has one or more user inputs such as buttons 210. For example, the buttons 210 may be capacitive buttons or capacitive touch sensors. Additionally or alternatively, each button 210 or other region of the panel 200 includes one or more capacitive sensors to sense finger movement (e.g., swipes or other gestures) at a touch region. For example, the user could swipe a finger from left to right (or towards the front or rear of the vehicle) over a button 210 or a touch region to lock the door and swipe a finger from right to left (or towards the rear or front of the vehicle) in the touch region to unlock the door. The touch region could support any number of different types of contact (e.g., short presses, long presses, different swipes, etc.) to control any number of functions of the vehicle (e.g., locking and unlocking doors, opening and closing windows, opening and closing the trunk, etc.).

While access authentication using cell phones and BLUETOOTH communication has been, in some cases, implemented in vehicles, there is the possibility that the phone may not work or be otherwise unavailable or that access may need to be provided for someone without a suitable phone. Thus, NFC (or other short range wireless communication protocols) may be provided as a secondary means of authentication and the system may maintain a physical reader at a convenient location (e.g., at or near the location of a traditional door handle of a vehicle). That is, the panel 200 may be located on one or more doors of the vehicle (e.g., the driver's door). Additional panels 200 may be located at other locations (e.g., at a trunk of the vehicle). Thus, the panel 200 may allow access to the functions of the panel when the user is authenticated via the primary method (e.g., via BLUETOOTH) or via the secondary method (e.g., NFC). The user may configure (e.g., enable/disable) the secondary method of access.

Optionally, the panel 200 includes an infrared (IR) gesture sensing module that includes a gesture region 220. The IR sensing module may sense waving, swiping and/or rotating hand gestures performed by a user in the vicinity of the gesture region 220. This provides the user with a means for activating several functions on the vehicle without requiring any physical contact with the vehicle. For example, the user may make a downward swiping motion in front of the gesture region 220, and if the user is authenticated (e.g., via a key fob, a mobile phone, an RFID tag, or other mobile identifier), the system may unlock the vehicle, roll down the windows, or any other appropriate response associated with the detected gesture. Different responses may be associated with different gestures. For example, swiping to the right unlocks the doors, swiping to the left locks the doors, swiping up closes the windows, and swiping down opens the windows.

Non-contact obstacle detection (NCOD) may include a radar imaging system designed to detect walls, posts, adjacent vehicles, or other nearby obstacles that might impede the movement of a power door. For example, the system may ensure, using NCOD, that the door will not impact an obstacle when opening. The panel 200 may include a radar module 230 that emits and receives radar signals to detect nearby obstacles or objects (such as by utilizing aspects of the systems described in U.S. Publication No. US-2021-0262274, which is hereby incorporated herein by reference in its entirety). When the system detects that there is an obstacle in the path of the door or that there is a likelihood greater than a threshold amount that the door will impact an obstacle, the system may prohibit the door from opening or only partially open the door. The system may provide the user or occupants of the vehicle a notification of the failure (e.g., via LED indicators 240 (FIG. 3), via a display, via an audible notification, or via any other means).

Figure 3:
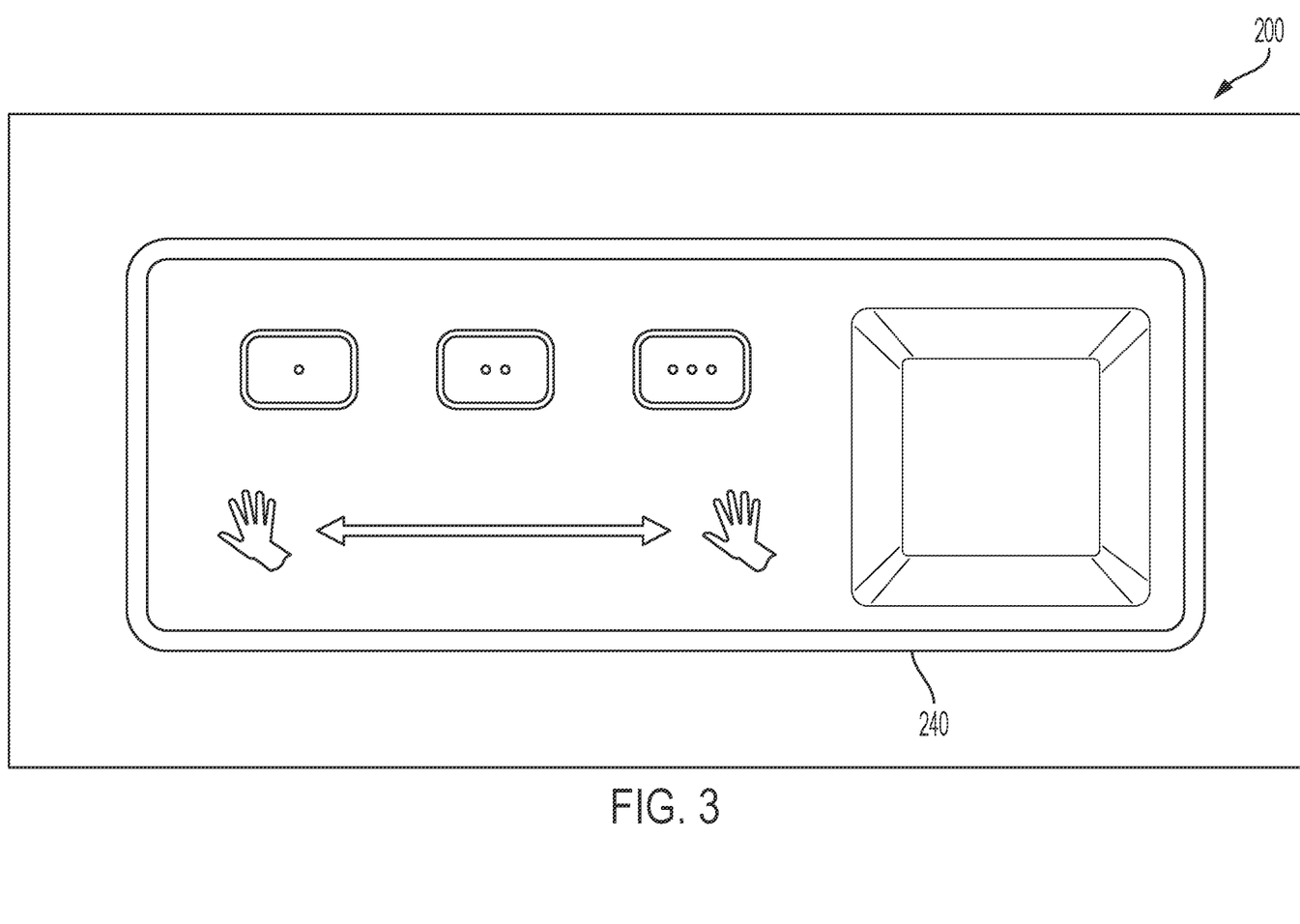
FIG. 3 is a plan view of the panel of FIG. 2 with an illuminator providing illumination.

As shown in FIG. 3, the panel 200 may include one or more LED indicators 240 that provide visual feedback to the user. For example, the LED indicators 240 may emit light when a user is recognized (e.g., via BLUETOOTH, NFC, biometrics, etc.) and/or when the system performs or fails to perform a function. For example, the LED indicators 240 may emit light of a first color (e.g., green) when a function is performed successfully and a second color (e.g., red) when a function is not performed successfully (e.g., the doors are not unlocked because the user is not verified or when a gesture is not recognized). The LED indicator 240 may comprise a light pipe that extends around the periphery of the panel 200 to provide a glow to provide feedback to the user (e.g., when the user is recognized and/or in response to user input). Thus, LED lighting (or other lighting elements) may provide a visual indication of the vehicle state and/or warn of pending movement (e.g., the door opening or closing), as well as indicate areas on the interface that can be touched or where a NFC card needs to be held. In some examples, the LED lighting may provide an indication or acknowledgment to a user when receiving a command and then provide a status of the command. For example, when the user provides an open door command (e.g., via the touch sensors), the LED lighting may provide an acknowledgment of the command (e.g., by blinking a specific color) and, after determining that no objects are within the swing path of the door, provide a second notification indicating the door is about to open (e.g., by changing colors or patterns). The panel 200 may use lighting of different colors, intensities, and illumination patterns to provide different feedback to the user.

Figure 4:
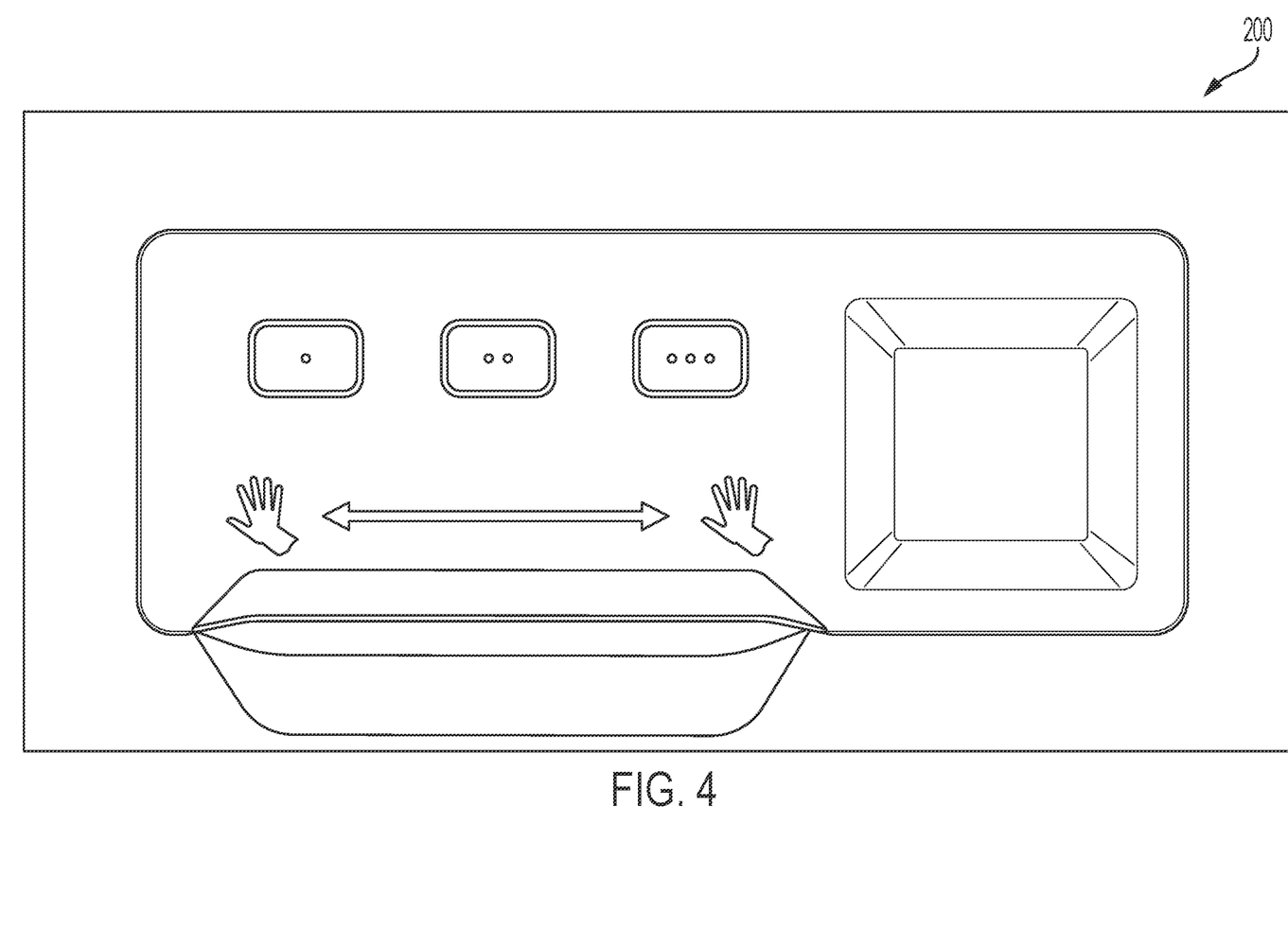
FIGS. 4 and 5 are plan views of a panel with an integrated door handle.
Figure 5:
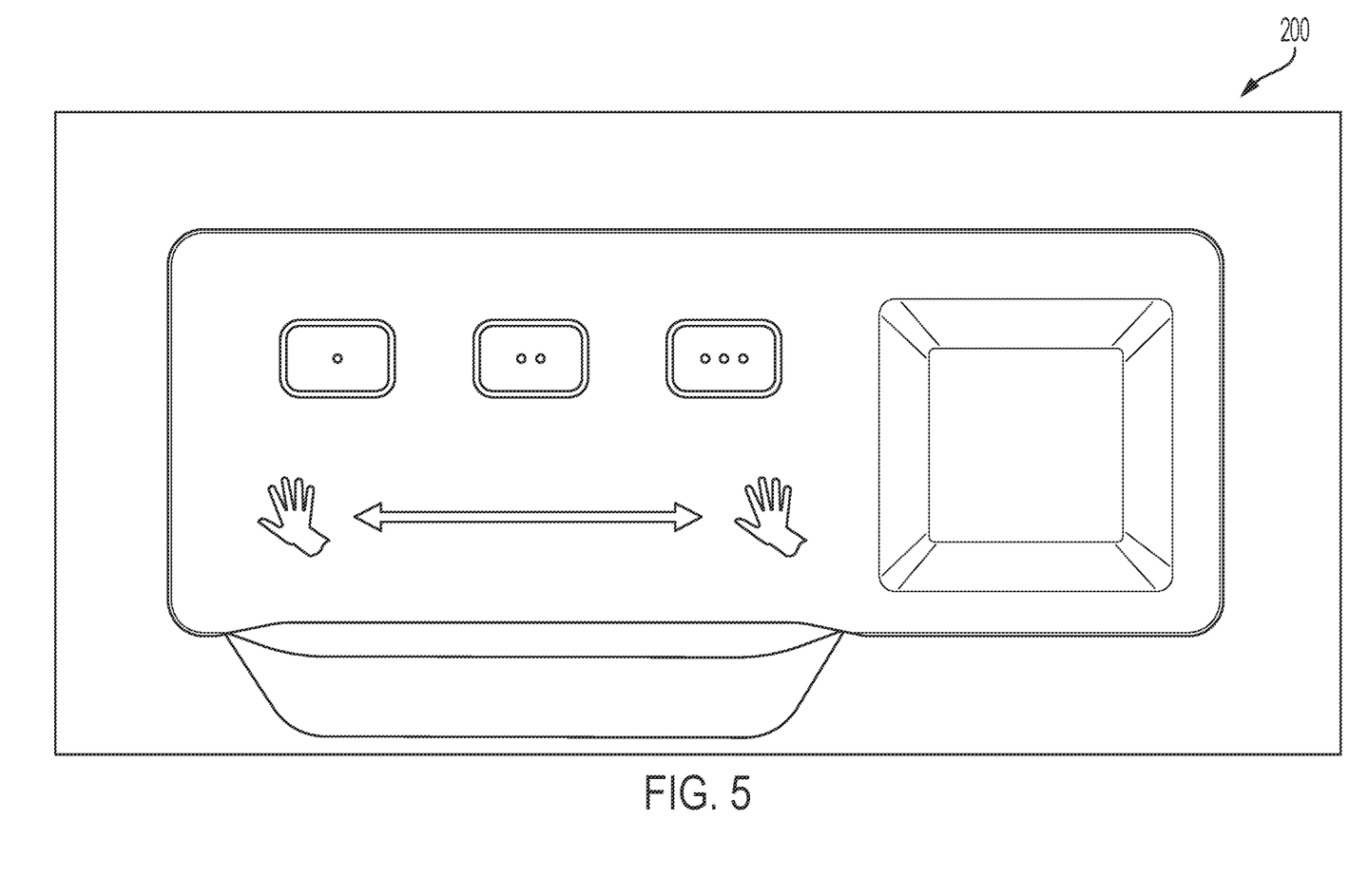

The panel may be part of a door handle assembly to manually open and close the vehicle door. For example, as shown in FIGS. 4 and 5, the panel 200 may provide finger access below and partially behind the panel such that the user grasps at or near the bottom of the panel to impart force on the door. As shown in FIG. 4, a portion of the panel 200 may be raised to increase the spacing between the panel 200 and the door to allow increased room for grasping. Alternatively, the panel 200 may remain flat and level and instead rely on a gap provided by an indentation in the vehicle door (FIG. 5). In other examples, the vehicle is equipped with a traditional handle, and the panel 200 is located near the handle. In yet other examples, the vehicle does not have a handle and instead only the panel 200 is present on the door.

Figure 6:
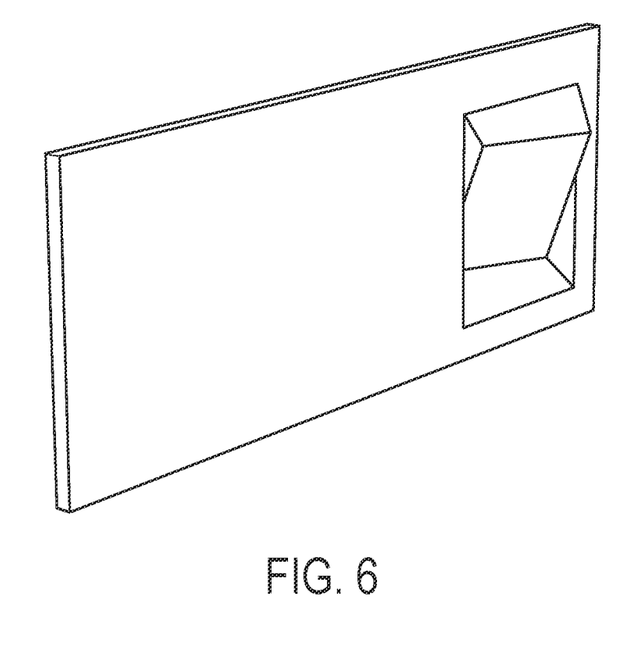
FIGS. 6-8 are perspective views of a panel with an integrated radar module.
Figure 7:
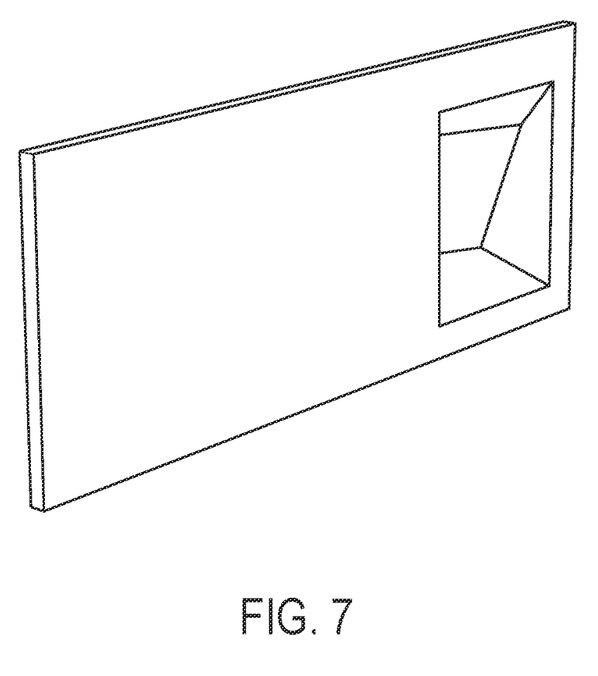
Figure 8:
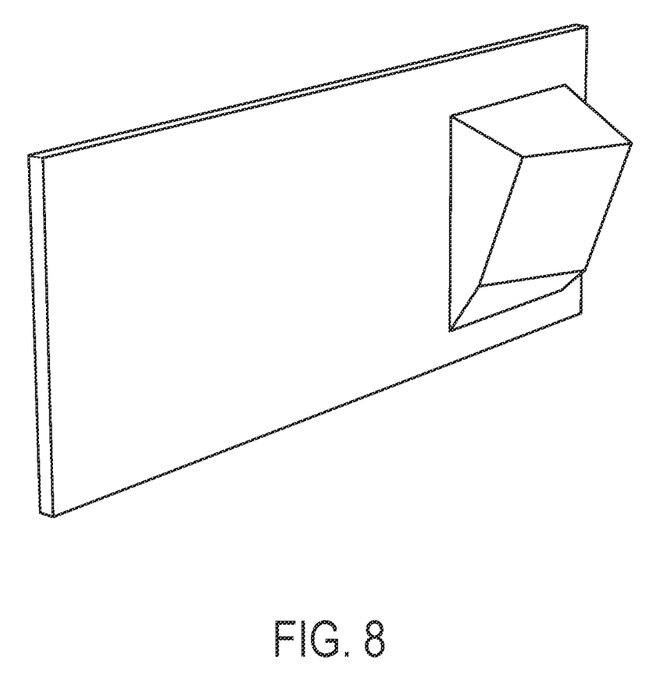
Figure 9:
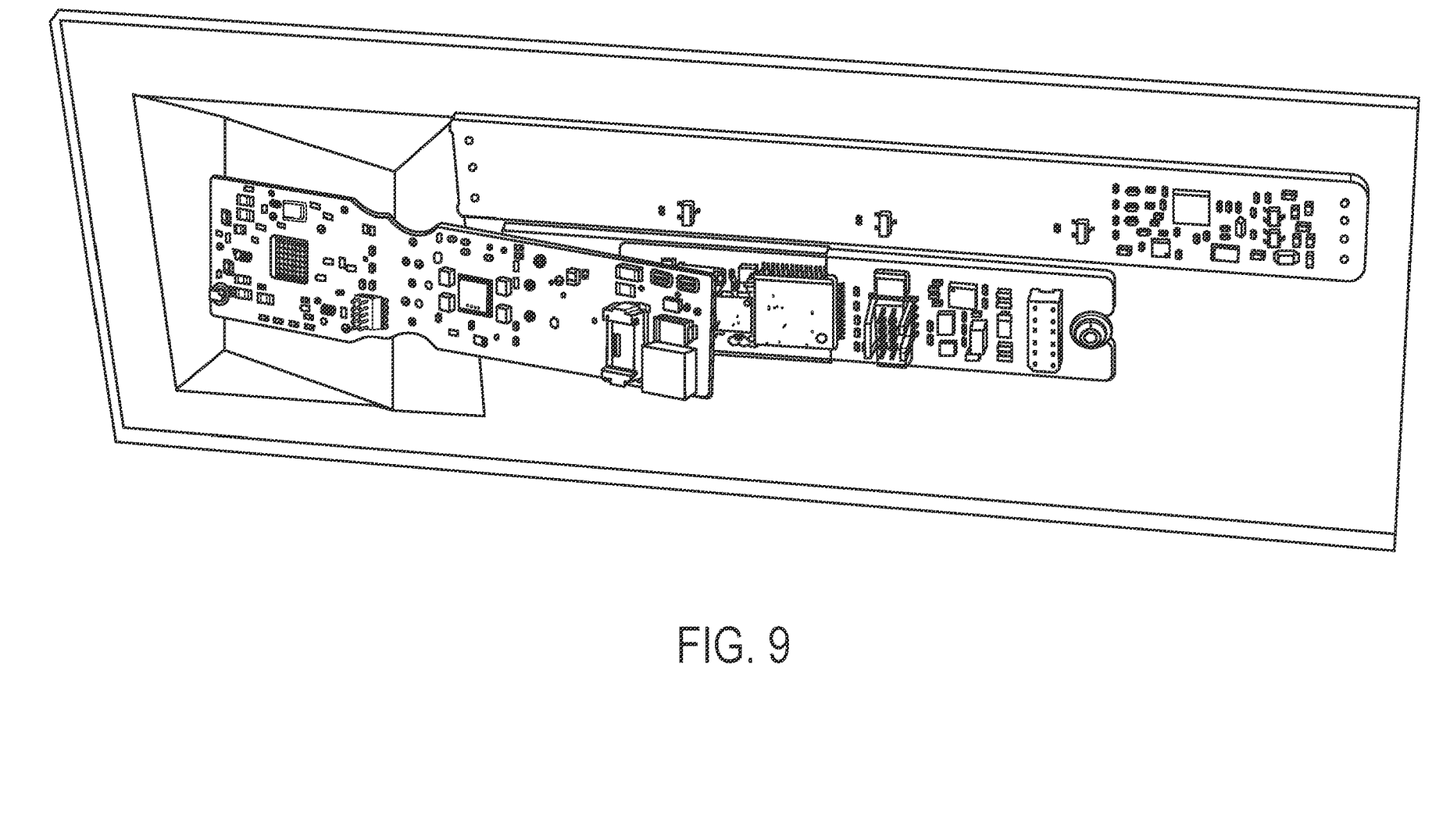
FIG. 9 is a perspective view of a plurality of printed circuit boards of a panel of the vehicular access system of FIG. 2.

FIGS. 6-8 are exemplary views of the panel and a shroud/housing for the radar imaging system. For example, the radar imaging system may be approximately flush with respect to the panel (FIG. 6), be recessed within the panel (FIG. 7), or protrude from the panel (FIG. 8). FIG. 9 provides a perspective view of the back of the panel and a plurality of printed circuit boards (PCBs) that house components for implementing the functions of the described system (e.g., a radar imaging system circuit board, a lighting element circuit board, a touch sensor circuit board, etc.).

Thus, the vehicular access system allows a user seamless entry into a vehicle via a door (e.g., a powered door) using touch and/or gestures. The system may allow for authentication using a mobile device (e.g., via BLUETOOTH or NFC). The system may provide a primary method for authentication (e.g., BLUETOOTH) and a secondary or fallback authentication method (e.g., NFC). The system may provide visual feedback to the user via one or more LED illuminators. The system may control a variety of functions of the vehicle, such as doors, windows, trunks, etc. The system may include a panel, a radar sensor, and a control (e.g., an electronic control unit (ECU)). The ECU receives commands from the panel via users interacting with the panel. For example, the command may be an open door command. The ECU may determine, using the radar sensor, whether any objects are within the swing path of the door. When there are no objects within the swing path of the door, the ECU may open the door. When one or more objects are within the swing path of the door, the ECU may prohibit the door from opening and provide a status update to the user.

The system may utilize sensors, such as radar sensors or imaging radar sensors or lidar sensors or the like, to detect presence of and/or range to objects and/or other vehicles and/or pedestrians. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular access system, the vehicular access system comprising:
    a sensing module disposed at a door of a vehicle equipped with the vehicular access system, wherein the sensing module comprises (i) a panel disposed at the door, the panel having an exterior surface that corresponds with an exterior surface of the door, (ii) at least one capacitive touch sensor for sensing proximity of a user at a touch sensing region of the panel and (iii) a radar sensor sensing exterior of the vehicle and capturing sensor data;
    an electronic control unit (ECU) comprising electronic circuitry and associated software;
    wherein the electronic circuitry of the ECU comprises a data processor for processing sensor data captured by the radar sensor to detect presence of an object exterior of the vehicle;
    at least one indicator for visually indicating status of the vehicular access system;
    wherein, responsive to touch or proximity of the user at the at least one capacitive touch sensor, an open door command is provided to the ECU;
    wherein, responsive to receiving the open door command, (i) the at least one indicator illuminates and (ii) the vehicular access system determines, using the sensor data, whether a detected object is within a swing path of the door; and
    wherein the vehicular access system, responsive to determining that no object is within the swing path of the door, opens the door.

2. The vehicular access system of claim 1, wherein the sensing module comprises part of a door handle of the door of the vehicle.

3. The vehicular access system of claim 1, wherein the panel comprises an outer surface of the door handle of the door of the vehicle, and wherein the user, when manually opening the door of the vehicle, at least partially grasps the panel to move the door of the vehicle.

4. The vehicular access system of claim 1, wherein the sensing module comprises a gesture sensor that has a gesture sensing region, and wherein the gesture sensing region comprises a three-dimensional space proximate to the door of the vehicle, and wherein the gesture sensor, responsive to sensing the user perform a gesture within the gesture sensing region, generates a function command for the vehicular access system.

5. The vehicular access system of claim 4, wherein the function command commands the vehicular access system to perform a function, the function comprising one selected from the group consisting of (i) lock a door of the vehicle, (ii) unlock a door of the vehicle, (iii) open a door of the vehicle, (iv) close a door of the vehicle, (v) open a window of the vehicle, (vi) close a window of the vehicle, (vii) open a trunk of the vehicle, and (viii) close a trunk of the vehicle.

6. The vehicular access system of claim 4, wherein the gesture sensor comprises an infrared gesture sensor.

7. The vehicular access system of claim 1, further comprising a near field communication (NFC) module, and wherein the vehicular access system, responsive to NFC communications with a mobile device carried by the user and prior to opening the door, authenticates the user.

8. The vehicular access system of claim 7, wherein the vehicular access system authenticates the user using the NFC module when a primary authentication system fails.

9. The vehicular access system of claim 8, wherein the primary authentication system comprises a BLUETOOTH module in communication with a user device of the user.

10. The vehicular access system of claim 9, wherein the user device comprises a mobile phone.

11. The vehicular access system of claim 1, wherein the sensing module comprises the at least one indicator.

12. The vehicular access system of claim 11, wherein the at least one indicator comprises a light pipe circumscribing the panel.

13. The vehicular access system of claim 1, wherein the status comprises at least one selected from the group consisting of (i) a locked status of the door of the vehicle, (ii) a movement status of the door of the vehicle, and (iii) an authentication status of the user.

14. The vehicular access system of claim 1, wherein the status of the vehicular access system is indicated at least in part by a color of light emitted by the at least one indicator.

15. The vehicular access system of claim 1, wherein, responsive to determining that no object is within the swing path of the door, illumination of the at least one indicator changes to indicate the door is opening.

16. The vehicular access system of claim 1, wherein the at least one capacitive touch sensor generates the open door command in response to the user moving a finger along a surface of the touch sensing region of the panel.

17. A vehicular access system, the vehicular access system comprising:
    a sensing module disposed at a door of a vehicle equipped with the vehicular access system, wherein the sensing module comprises (i) a panel disposed at the door, the panel having an exterior surface that corresponds with an exterior surface of the door, (ii) at least one capacitive touch sensor for sensing proximity of a user at a touch sensing region of the panel, (iii) a radar sensor sensing exterior of the vehicle and capturing sensor data and (iv) at least one indicator for visually indicating status of the vehicular access system, and wherein the at least one indicator comprises a light pipe;

an electronic control unit (ECU) comprising electronic circuitry and associated software;

wherein the electronic circuitry of the ECU comprises a data processor for processing sensor data captured by the radar sensor to detect presence of an object exterior of the vehicle;

wherein, responsive to touch or proximity of the user at the at least one capacitive touch sensor, an open door command is provided to the ECU;

wherein, responsive to receiving the open door command, (i) the at least one indicator illuminates and (ii) the vehicular access system determines, using the sensor data, whether a detected object is within a swing path of the door; and wherein the vehicular access system, responsive to determining that no object is within the swing path of the door, opens the door.

18. The vehicular access system of claim 17, wherein the sensing module comprises part of a door handle of the door of the vehicle.

19. The vehicular access system of claim 17, wherein the panel comprises an outer surface of the door handle of the door of the vehicle, and wherein the user, when manually opening the door of the vehicle, at least partially grasps the panel to move the door of the vehicle.

20. The vehicular access system of claim 17, wherein the light pipe at least partially circumscribes the panel.

21. The vehicular access system of claim 20, wherein the light pipe fully circumscribes the panel.

22. A vehicular access system, the vehicular access system comprising:

a sensing module disposed at a door of a vehicle equipped with the vehicular access system, wherein the sensing module comprises (i) a panel disposed at the door, the panel having an exterior surface that corresponds with an exterior surface of the door, (ii) at least one capacitive touch sensor for sensing proximity of a user at a touch sensing region of the panel and (iii) a radar sensor sensing exterior of the vehicle and capturing sensor data;

an electronic control unit (ECU) comprising electronic circuitry and associated software;

wherein the electronic circuitry of the ECU comprises a data processor for processing sensor data captured by the radar sensor to detect presence of an object exterior of the vehicle;

at least one indicator for visually indicating status of the vehicular access system;

wherein, responsive to touch or proximity of the user at the at least one capacitive touch sensor, an open door command is provided to the ECU;

wherein, responsive to receiving the open door command, (i) the at least one indicator illuminates to indicate the open door command is received and (ii) the vehicular access system determines, using the sensor data, whether a detected object is within a swing path of the door; and wherein, responsive to determining that the detected object is within the swing path of the door, illumination of the at least one indicator changes to indicate that the door will not open.

23. The vehicular access system of claim 22, wherein the sensing module comprises a gesture sensor that has a gesture sensing region, and wherein the gesture sensing region comprises a three-dimensional space proximate to the door of the vehicle, and wherein the gesture sensor, responsive to sensing the user perform a gesture within the gesture sensing region, generates a function command for the vehicular access system.

24. The vehicular access system of claim 22, further comprising a near field communication (NFC) module, and wherein the vehicular access system, responsive to NFC communications with a mobile device carried by the user and prior to opening the door, authenticates the user.

25. The vehicular access system of claim 24, wherein the vehicular access system authenticates the user using the NFC module when a primary authentication system fails.

* * * * *